United States Patent
Sobalvarro et al.

(10) Patent No.: US 11,635,749 B2
(45) Date of Patent: Apr. 25, 2023

(54) OPTIMIZED FACTORY SCHEDULE AND LAYOUT GENERATION

(71) Applicants: Patrick Sobalvarro, Harvard, MA (US); Clara Vu, Cambridge, MA (US); Joshua Downer, Stoneham, MA (US); Paulo Ferreira, Burlington, MA (US); Mehmet Ali Guney, Malden, MA (US); Thomas C. Ferree, Waltham, MA (US); Alberto Moel, Cambridge, MA (US); Richard A. Kelsey, Belmont, MA (US)

(72) Inventors: Patrick Sobalvarro, Harvard, MA (US); Clara Vu, Cambridge, MA (US); Joshua Downer, Stoneham, MA (US); Paulo Ferreira, Burlington, MA (US); Mehmet Ali Guney, Malden, MA (US); Thomas C. Ferree, Waltham, MA (US); Alberto Moel, Cambridge, MA (US); Richard A. Kelsey, Belmont, MA (US)

(73) Assignee: VEO ROBOTICS, INC., Waltham, MA (US)

( * ) Notice: Subject to any disclaimer, the term of this patent is extended or adjusted under 35 U.S.C. 154(b) by 0 days.

(21) Appl. No.: 17/567,425

(22) Filed: Jan. 3, 2022

(65) Prior Publication Data
US 2022/0121181 A1    Apr. 21, 2022

Related U.S. Application Data

(63) Continuation of application No. 17/019,615, filed on Sep. 14, 2020, now Pat. No. 11,256,241.
(Continued)

(51) Int. Cl.
*G05B 19/418* (2006.01)

(52) U.S. Cl.
CPC ... *G05B 19/41865* (2013.01); *G05B 19/4183* (2013.01); *G05B 19/41885* (2013.01)

(58) Field of Classification Search
CPC .......... G05B 19/41865; G05B 19/4183; G05B 19/41885
See application file for complete search history.

(56) References Cited

U.S. PATENT DOCUMENTS

| | | | |
|---|---|---|---|
| 5,432,887 | A  | 7/1995 | Khaw |
| 7,904,192 | B2 | 3/2011 | Chua et al. |

(Continued)

FOREIGN PATENT DOCUMENTS

| | | |
|---|---|---|
| EP | 0487419 A2 | 5/1992 |
| EP | 0488246 A2 | 6/1992 |
| EP | 2224384 A1 | 9/2010 |

OTHER PUBLICATIONS

Andreasson, Henrik et al. "Autonomous Transport Vehicles: Where We Are and What Is Missing", IEEE Robotics & Automotive Magazine, Mar. 13, 2015, 12 pages, 1070-9932, http://www.ieee.org/publications_standards/publications/rights/index.html.
(Continued)

*Primary Examiner* — Christopher E. Everett
(74) *Attorney, Agent, or Firm* — Morgan, Lewis & Bockius LLP

(57) ABSTRACT

Systems and methods for optimizing factory scheduling, layout or both which represent active factory elements (human and machine) as computational objects and simulate factory operation to optimize a solution. This enables the efficient assembly of customized products, accommodates variable demand, and mitigates unplanned events (floor blockages, machines/IMRs/workcell/workers downtime, variable quantity, location, and destination of supply parts).

14 Claims, 11 Drawing Sheets

Related U.S. Application Data

(60) Provisional application No. 62/899,419, filed on Sep. 12, 2019.

(56) References Cited

U.S. PATENT DOCUMENTS

| | | | |
|---|---|---|---|
| 8,326,447 | B2 | 12/2012 | Sidner et al. |
| 10,222,789 | B2 | 3/2019 | Kothari et al. |
| 10,295,979 | B2 | 5/2019 | Norman |
| 10,365,638 | B2 | 7/2019 | Jan |
| 10,445,667 | B2 | 10/2019 | Hamilton et al. |
| 10,496,436 | B2 | 12/2019 | Song et al. |
| 10,559,043 | B1 | 2/2020 | Schlintl |
| 10,627,808 | B2 | 4/2020 | Hamling |
| 10,642,257 | B2 | 5/2020 | Hsieh et al. |
| 2008/0177587 | A1 | 7/2008 | Cushing et al. |
| 2008/0301012 | A1 | 12/2008 | Cogswell et al. |
| 2011/0153080 | A1* | 6/2011 | Shapiro ............... B25J 9/1666 700/255 |
| 2012/0010758 | A1 | 1/2012 | Francino et al. |
| 2017/0090440 | A1 | 3/2017 | Eck et al. |
| 2019/0262991 | A1 | 8/2019 | Sugiyama et al. |
| 2019/0262993 | A1 | 8/2019 | Cole et al. |
| 2020/0130936 | A1* | 4/2020 | Shekhawat ............ B25J 9/1664 |
| 2020/0164516 | A1 | 5/2020 | Lehment et al. |

OTHER PUBLICATIONS

B&R Automation. "The Adaptive Machine: Achieving Batch Size One", Oct. 2018, 30 pages, B&R Industrial Automation GmbH, Strasse 1, 5142 Eggelsberg, Austria.

Digani, Valerio. "Traffic Coordination for AGV Systems: an Ensemble Modeling Approach", Mar. 2016, 130 pages, Dottorato Di Ricerca In Ingegneria Dell'Innovazione Industriale, Ciclo XXVIII, Universita degli Studi di Modena e Reggio Emilia, Italy.

Gobetto, Marco. "Operations Management in Automotive Industries", 2014, 258 pages, From Industrial Strategies to Production Resource Management, Through Industrialization Process and Supply Chain to Pursue Value Creation, Springer Series in Advanced Manufacturing, FIAT Sepin S.cp.A. and Politecnico of Turin, Turin, Italy, http://www.springer.com/series/7113.

Kupper, Daniel et al. "The Factory of the Future", Dec. 2016, 20 pages, The Boston Consulting Group, Inc. RWTH Aachen University.

Llika, Dan. "Auto News: Here's How Audi Plan to Scrap the Assembly Line", Jul. 17, 2017, 6 pages, AutoGuide.com, https://www.autoguide.com/auto-news/2017/07/here-s-how-audi-plans-to-scrap-the-assembly-line.html.

Michalos, George et al. "ROBO-PARTNER: Seamless Human-Robot Cooperation for Intelligent, Flexible and Safe Operations in the Assembly Factories of the Future", 2014, 6 pages, Published by Elsevier B.V. http://creativecommons.org/license/by-nc-nd/3.0/.

Papakostas, Nikolaos et al. "Integrated Simulation-based facility layout and complex production line design under uncertainty", CIRP Annals—Manufacturing Technology, May 5, 2018, 4 pages, vol. 67, Issue 1, 2018, pp. 451-454, Lab for Advanced Manufacturing Simulation, School of Mechanical and Materials Engineering, University College Dublin, Belfield, Dublin 4, Ireland, https://doi.org/10.1016/j.cirp.2018.04.111.

Parker, Lynne E. "Path Planning and Motion Coordination in Multiple Mobile Robot Teams" in Encyclopedia of Complexity and System Science, 2009, 24 pages, Department of Electrical Engineering and Computer Science, University of Tennessee, Knoxville, Tennessee, USA.

Sabella, Roberto et al. "Ericsson Technology Review: Industrial Automation Enabled by Robotics, Machine Intelligence and 5G", Feb. 15, 2018, 13 pages, ISSN 0014-0171, Ericsson AB 2018 Ericsson SE-164 83 Stockholm, Sweden.

Zheng, Shuai et al. "Manufacturing Dispatching using Reinforcement and Transfer Learning", Oct. 4, 2019, 16 pages, Industrial AI Lab, Hitachi America Ltd, Santa Clara, CA, USA.

Wayland, Michael. "Automatic News: Forget the assembly line: Inside Kuka, the future is cells", Jul. 30, 2018, 2 pages, 2018 Crain Communications, Inc., http://www.autonews.com/apps/pbcs.d11/article?AID=/20180730/OEM01/180739931/&template=print.

Zhang, Z. et al. A simulation-based approach for plant layout design and production planning. J Ambient Intell Human Comput 10, 1217-1230 (2019). https://doi.org/10.1007/s12652-018-0687-5 (Year: 2019).

I.E. Grossmann, J. et al. "GAMS/DICOPT: A Discrete Continuous Optimization Package," Math. Methods Appl. Sci., vol. 24, No. 11, pp. 649-664, Jul. 2001 (reference dated Jan. 27, 2003) (Year: 2003).

* cited by examiner

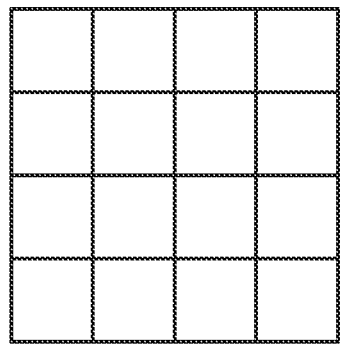
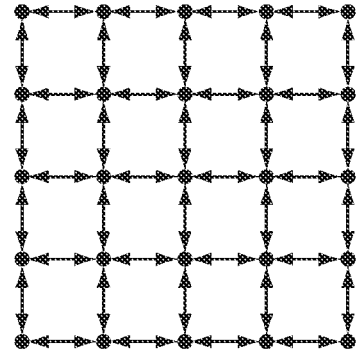
FIG. 14A                    FIG. 14B
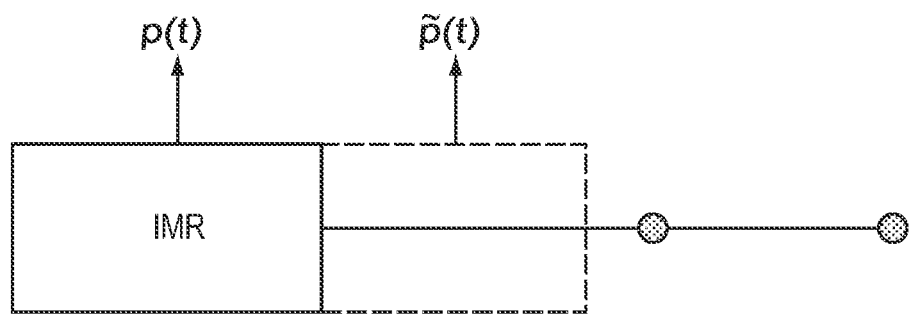
FIG. 15

OPTIMIZED FACTORY SCHEDULE AND LAYOUT GENERATION

CROSS-REFERENCE TO RELATED APPLICATION

This application is a continuation of U.S. application Ser. No. 17/019,615, filed on Sep. 14, 2020, which claims priority to and the benefit of, and incorporates herein by reference in its entirety, U.S. Provisional Patent Application No. 62/899,419, filed on Sep. 12, 2019.

FIELD OF THE INVENTION

The field of the invention relates, generally, to planning industrial environments and scheduling production sequences therein.

BACKGROUND

Dedicated manufacturing lines are based on fixed automation and labor combinations making parts or components in long production runs, at high volume, and with limited product variability. Each dedicated line is typically designed to produce a small number of distinct parts at high production rates achieved by high utilization of the entire production line. When product demand is high and cost per part is low, dedicated manufacturing lines are cost-effective as long as they can operate at high utilization. But manufacturing companies face increasingly frequent and unpredictable market changes, driven by global competition (including the rapid introduction of new products) and constantly varying product demand. To stay competitive, companies must design manufacturing systems that not only produce high-quality goods at low cost, but that are responsive to market changes and evolving consumer preferences.

Increasing global competition, shorter production runs, and greater product variability disadvantage traditional dedicated manufacturing lines. Substantial efforts have been devoted to organizing production using active, context-aware, autonomous systems. This paradigm reflects a shift from static process chains towards more automation and autonomy, with context-aware facilities capable of efficiently combining and reorganizing manufacturing steps to create various product types and variants cost-effectively, even in small lot sizes.

The increase in complexity of manufacturing systems, together with the fact that small-lot production is becoming more common than mass production, are some of the challenges engineers face in advanced manufacturing facilities. The traditional assembly line is ill-suited to this kind of dynamic manufacturing, and hence alternative manufacturing methods and technologies are being developed.

One approach to separate the manufacturing line into independent workcells, arrayed not in a one-dimensional fixed path, as in a traditional line, but in an arbitrary modular assembly layout on the factory floor. Modularity makes every production system scalable and adaptable as model diversity grows, allowing different levels of product customization to be achieved efficiently, and decreasing inactivity when compared to a traditional assembly line across different workstations with fixed operations.

This arrangement provides for a much higher level of flexibility in terms of production profile arrangements, corresponding to variations in demand or product specifications, and tighter economic coupling between production needs and capital efficiency. The downside is greater complexity in the factory layout design and resource orchestration, which includes workers, transportation, workcell scheduling processes, ordering and prioritization of process steps, and materials and parts-flow routing.

A modular factory is like a distributed system, lacking centralized synchronization. In an assembly line, the movement of work items down the line determines the rate at which each task is completed, and each task must be completed before its successor can begin. This is not the case in a modular factory, in which tasks need to be coordinated so that they do not conflict with one another. Since delays accumulate over time, it is essential that the method of coordination is able to adapt to changes during production. To ensure the efficiency of a modular factory, it is essential to coordinate the activities of workcells and movement of work items between workcells to maximize resource utilization and minimize transport delays. This implies the need for efficiency both in terms of the layout of the factory and scheduling of production tasks, i.e., in space and time. While interrelated, these objectives can be approached separately and each can, to some extent, compensate for weaknesses in the other; efficient scheduling can mitigate layout bottlenecks while well-organized factory layouts can minimize wait times between fabrication tasks, dwell times at task stations due to late arrival of work in process, and down time resulting from collisions or safety-mandated pauses as human operators pass through work areas. Achieving either objective, however, poses significant engineering challenges.

SUMMARY

Systems and methods in accordance herewith optimize factory scheduling, layout or both by representing active factory elements (human and machine) as computational objects and simulating factory operation to optimize a solution. This enables the efficient assembly of customized products, accommodates variable demand, and mitigates unplanned events (floor blockages, downtime, and variability in the quantity, location, and destination of supply parts). Various embodiments optimize factory efficiency and performance in terms of production throughput, process cost-reduction, energy consumption (transportation, machines, AC/heating, etc), inventory control, materials/parts/products waste, or other optimization parameters.

The combination of an optimized factory layout design with orchestration algorithms for routing and scheduling enables highly efficient operations for assembly of standard and customized products with variable demand while dealing with unpredictable and/or dynamic events (e.g., machines/mobile robots/workcell/workers downtime, floor blockages, variable quantity/location/destination of supply parts, work in progress and final products). During operation, the status of the elements affecting the assembly processes may change dynamically and unpredictably.

The optimization functions used to evaluate the performance of the layout design when the factory operates with specific scheduling and routing algorithms may reflect multiple and possibly conflicting goals. These goals can be classified into two different groups: maximization and minimization. The first group may comprise maximization goals including performance, revenue, system reliability (e.g., number of redundant workcells, backup workcells), resource utilization (e.g., workcell throughput, transportation utilization), and flexibility (e.g., production of multiple product variations).

The second group may comprise minimization goals including operational costs related to material handling and energy consumption, upfront investment (e.g., fewer machines/equipment/workers), inventory/storage requirements, production/assembly time for each different product variation (the combination of workcell sequences), path distance for IMRs for item pickup and delivery, IMR (intelligent mobile robot) travel time (assuming travel safety is guaranteed) for item pickup and delivery, the number of transportation units, the number of workers, number of unserved requests, the average and maximum number of simultaneous requests, work-in-progress waiting time, work-in-progress line length across the factory, and traffic congestion; and for multiple deliveries/requests from same transportation unit, minimizing the time the last destination is served (makespan) and minimizing the total completion time (latency).

Accordingly, in a first aspect, the invention pertains to a method of scheduling, for execution on a factory floor having a layout, a plurality of interrelated manufacturing processes. In various embodiments, the method comprises the steps of (a) storing, in a computer memory, a plurality of factory object data structures each corresponding to a machine or a human and containing data and/or instructions for simulating behavior in (i) carrying out a factory task, (ii) any allowed movement about the manufacturing floor layout, (iii) speed of operation and movement based on inherent characteristics of the machine or the human and proximity thereof to other objects, the object data structures including parameter values constraining the simulated behavior; (b) receiving, by a computational simulator, a work order specifying factory inputs and outputs and an objective function specifying a quantity to be maximized; and (c) based on the work order, simulating, using the computational simulator and the stored object data structures, operation of the factory. Step (c) may be iteratively repeated with object parameter values that have been updated in accordance with an optimization algorithm until the quantity specified by the objective function is maximized. Finally, an operation schedule for the machines represented by factory object data structures is generated.

The method may further comprise the steps of storing, in the computer memory, a plurality of layout constraints computationally generating a proposed layout of the factory in accordance with the stored layout constraints; based on the work order, simulating, using the computational simulator and the stored object data structures, operation of the factory in accordance with the layout; and iteratively repeating the previous two steps with new layouts updated in accordance with the layout constraints by an optimization algorithm until the quantity specified by the objective function is maximized.

In another aspect, the invention relates to an apparatus for scheduling, for execution on a factory floor having a layout, a plurality of interrelated manufacturing processes. In various embodiments, the apparatus comprises a processor; a computer memory; stored in the computer memory, a plurality of factory object data structures each corresponding to a machine or a human and containing data and/or instructions for simulating behavior in (i) carrying out a factory task, (ii) any allowed movement about the manufacturing floor layout, (iii) speed of operation and movement based on inherent characteristics of the machine or the human and proximity thereof to other objects, the object data structures including parameter values constraining the simulated behavior; and a simulation module executable by the processor and configured to (i) simulate operation of the factory using the stored object data structures and in accordance with a work order specifying factory inputs and outputs and an objective function specifying a quantity to be maximized, (ii) iteratively repeat the simulation with object parameter values that have been updated in accordance with an optimization algorithm until the quantity specified by the objective function is maximized, and (iii) based thereon, generate an operation schedule for the machines represented by factory object data structures.

Still another aspect of the invention pertains to a method of designing a layout of a factory for executing therein a plurality of interrelated manufacturing processes. In various embodiments, the method comprises the steps of (a) storing, in a computer memory, a plurality of layout constraints; (b) storing, in a computer memory, a plurality of factory object data structures each corresponding to a machine or a human and containing data and/or instructions for simulating behavior in (i) carrying out a factory task, (ii) any allowed movement about a selected layout of the factory, (iii) speed of operation and movement based on inherent characteristics of the machine or the human and proximity thereof to other objects, the object data structures including parameter values constraining the simulated behavior; (c) receiving, by a computational simulator, a work order specifying factory inputs and outputs and an objective function specifying a quantity to be maximized; (d) computationally generating a proposed layout of the factory in accordance with the stored layout constraints; (e) based on the work order, simulating, using the computational simulator and the stored object data structures, operation of the factory in accordance with the layout; and (f) iteratively repeating steps (d) and (e) with new layouts updated in accordance with the layout constraints by an optimization algorithm until the quantity specified by the objective function is maximized.

In some embodiments, the method includes the step of generating an optimized operation schedule for the machines represented by factory object data structures in accordance with the layout.

In yet another aspect, the invention relates to an apparatus for designing a layout of a factory for executing therein a plurality of interrelated manufacturing processes. In various embodiments, the apparatus comprises a processor; a computer memory; stored in the computer memory, a plurality of layout constraints and a plurality of factory object data structures, each of the factory object data structures corresponding to a machine or a human and containing data and/or instructions for simulating behavior in (i) carrying out a factory task, (ii) any allowed movement about a selected layout of the factory, (iii) speed of operation and movement based on inherent characteristics of the machine or the human and proximity thereof to other objects, the object data structures including parameter values constraining the simulated behavior; and a simulation module executable by the processor and configured to (i) generate a proposed layout of the factory in accordance with the stored layout constraints, (ii) simulate operation of the factory in accordance with the layout, and (iii) iteratively repeat (i) and (ii) with new layouts updated in accordance with the layout constraints by an optimization algorithm until the quantity specified by the objective function is maximized.

The foregoing aspects may include one or more of the following features. The objective function may specify at least one of (i) minimum time for work order completion, (ii), output quantity, (iii) output quality, (iv) safety to humans, (v) minimum power consumption, (vi) a production cost function, or (vii) a production profit function. The optimization algorithm may be a continuous optimization algorithm, a reinforcement learning algorithm, or a linear program (e.g., the simplex algorithm).

At least some of the objects may correspond to mobile transport machines, and these objects specify (i) capability parameter values including a movement speed range of the mobile transport machine and a payload capacity of the machine, (ii) behavior parameter values including speed restrictions of the mobile transport machine based on proximity of the mobile transport machine to machines or humans represented by other objects, and (iii) mobile transport machine loading and unloading capabilities. In various embodiments, at least some of the objects correspond to production machines, the production machine objects specifying (i) capability parameter values including a maximum processing speed of the production machine, (ii) behavior parameter values including speed restrictions of the production machine based on proximity of the production machine to machines or humans represented by other objects, and (iii) functions performed by the production machines.

Objects may be organized as a precedence graph in accordance with the work order.

In general, as used herein, the term "substantially" means±10%, and in some embodiments, ±5%. In addition, reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIG. 14A illustrates representation of a factory floor as a grid, and FIG. 14B indicates the locations of the nodes and edges of a transportation network through the grid.

FIG. 15 illustrates the prediction of a mobile robot position on a given path or trajectory.

DETAILED DESCRIPTION

1. Representative Architecture

Figure 1:
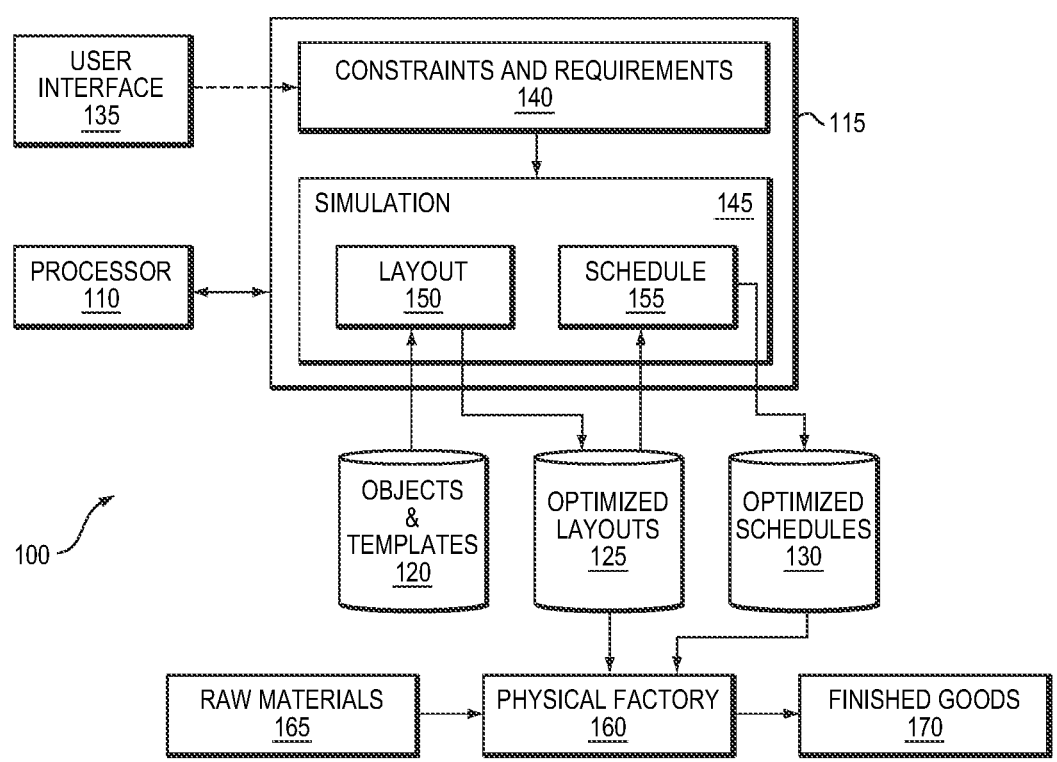
FIG. 1 schematically illustrates a factory simulation system for layout and scheduling in accordance with embodiments of the invention.

A representative system is illustrated in FIG. 1. The system 100 includes a processor 110 (e.g., a conventional CPU microprocessor), associated volatile system memory 115 and one or more non-volatile digital storage elements (such as a hard disk, Flash memory, optical drive, etc.). Stored in non-volatile memory are a template store 120, a store 125 for optimized factory layouts, and a store 130 for optimized factory schedules. Any or all of these stores may be organized as databases or simple file hierarchies.

A user interface 135 permits the user to enter, or specify files containing, factory constraints and requirements 140 that are stored in the system memory 115 and provided to a simulation module 145. The simulation module 145 includes a layout subsystem 150 that accesses data in the template store 120 to produce, in the manner described in detail below, an optimized layout based on the user-provided constraints and factory requirements 140. The template store 120 contains factory objects and, if desired, basic combinations of these objects that are frequently used in factory layouts. The scheduling subsystem 155 takes the optimized layout produced by the layout subsystem 150, or a fixed layout provided by the user, and produces an optimized schedule. The layout and scheduling subsystems 150, 155 can work in tandem (rather than sequentially) to produce an optimized layout and schedule; in this way, scheduling considerations can influence layout optimization.

The optimized layout and schedule are used to organize and run a physical factory 160, in which raw materials 165 are transformed into finished goods 170.

The simulation module 145, whose operation is described below, may include one or more modules implemented in hardware, software, or a combination of both. For embodiments in which the functions are provided as one or more software programs, the programs may be written in any of a number of high level languages such as PYTHON, FORTRAN, PASCAL, JAVA, C, C++, C#, BASIC, various scripting languages, and/or HTML. Additionally, the software can be implemented in an assembly language directed to the microprocessor resident on a target computer; for example, the software may be implemented in Intel 80×86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM. Embodiments using hardware circuitry may be implemented using, for example, one or more FPGA, CPLD or ASIC processors.

2. Factory Objects

The simulations performed in accordance herewith utilize "factory objects" to represent the various human and machine elements actively involved in the process to be optimized. These elements include workcells, robots, humans, production machinery, work-in-process, tools, and parts. Factory objects may be represented in conventional object-oriented fashion as class types with associated (encapsulated) methods using, e.g., JAVA, C++ or PYTHON. Alternatively, methods can be distinct from the factory objects and executed by the simulation module 145, with the factory objects containing data values that guide the simulator in executing the methods and simulating the object.

For example, objects corresponding to mobile transport machines may specify (i) capability parameter values including a movement speed range of the mobile transport machine and a payload capacity of the machine, (ii) behavior parameter values including speed restrictions of the mobile transport machine based on proximity of the mobile transport machine to machines or humans represented by other objects, (iii) additional functions on the mobile transport machine, such on-board manufacturing functions or processing, (iv) mobile transport machine loading and unloading capabilities, and (v) information about the mobile transport machine, such as battery life or maintenance intervals. Objects corresponding to production machines may specify (i) capability parameter values including a maximum processing speed of the production machine, (ii) behavior parameter values including speed restrictions of the production machine based on proximity of the production machine to machines or humans represented by other objects, (iii) functions of the production machines, (iv) lifetime and maintenance parameters of the production machines, (v) information about production machine functions that would allow replacement by other machines with different specifications as needed, (vi) a machine support package outlining machine functionality and parameters necessary for operation, such as brand, necessary inputs, and part information.

A representative set of factory objects appears in Table 1 below. Each of the objects includes a set of associated methods as well as attributes specifying characteristics of, and parameter values associated with, the object. The simulator 145 instantiates specified objects and uses their associated methods and attributes to simulate operation of the elements that the objects represent, including interaction among elements. Frequently, an associated method is generic and, when instantiated, reads the attributes to obtain values for the method variables.

TABLE 1

| Object | Associated Methods | Attributes |
|---|---|---|
| Mobile transport machine/robot | Move from point to point given a floor layout | Autonomous, guided, or remotely controlled |
| | Pick up raw material or workpiece | Payload, physical dimensions and geometries, speeds |
| | Perform manufacturing operation on workpiece while on mobile transport machine | Turning radius |
| | | Other functions besides transport: on-board manufacturing, processing |
| | Deliver (offload) raw material or workpiece | Brand, equivalent objects for replacement |
| | Speed and separation monitoring | Maintenance schedules and preventive maintenance |
| Painting station | Pick part from conveyor or mobile transport machine | Type and color of paint |
| | | Paint remaining |
| | Paint part | Primer and finishing processes available or required |
| | Offload painted part to conveyor or mobile transport machine | Maintenance schedules and instructions |
| | No allowed movement | |
| | Speed and separation monitoring (human may approach) | |
| Subtractive metal or plastic fabrication station | Pick part from conveyor or mobile transport machine | Machining processes available (e.g. CNC, lathe, mill, drill press, metal bending) |
| | Machine or process part | |
| | No allowed movement | Machine brand and functionality |
| | Speed and separation monitoring or guarding | Maintenance schedules and consumables tables |
| | | Physical dimensions of machines and possible part operations |
| Additive metal or plastic fabrication station | Pick part from conveyor or mobile transport machine | Additive processes available (e.g. 3D printing, sintering) |
| | Machine or process part through additive processes | Machine brand and functionality |
| | No allowed movement | Maintenance schedules and consumables tables |
| | Speed and separation monitoring or guarding | Physical dimensions of machines and possible part operations |

TABLE 1-continued

| Object | Associated Methods | Attributes |
|---|---|---|
| Welding station | Pick parts from conveyor or mobile transport machine Weld parts Offload welded parts to conveyor or mobile transport machine No allowed movement Speed and separation monitoring (human may approach) | Weld types possible Electrical and mechanical characteristics Brand and type of welding equipment Welding recipes |
| General assembly station | Pick parts from conveyor or mobile transport machine Humans perform assembly operations on workpieces using tools on station Put parts back on conveyor or mobile transport machine | Description of type and number of available tools (power tools, wrenches, etc) List of potential assembly operations possible with existing tool set Tool wear and maintenance schedules |
| Robot station | Pick parts from conveyor or mobile transport machine Robot perform assembly or manufacturing operations on workpieces using end of arm tooling on station Put parts back on conveyor or mobile transport machine | Robot arm type, brand and description (speed, payload, functional applications) Description of type and number of available end of arm tooling tools (power tools, wrenches, etc.) List of potential assembly operations possible with existing tool set Tool wear and maintenance schedules |
| Parts supermarket station | Store work in progress, assembly parts, or consumables used in manufacturing process No allowed movement Human or mobile transport machine may load or unload parts bin | Part type and number Consumption rates Replacement and refill information |
| Human operator | Generate potential occupancy envelope based on model of human anatomy and movement Move from point to point given a floor layout | Skills and certifications Physical strength Shift and health information such as required breaks |

3. Layout Optimization

Figure 2:
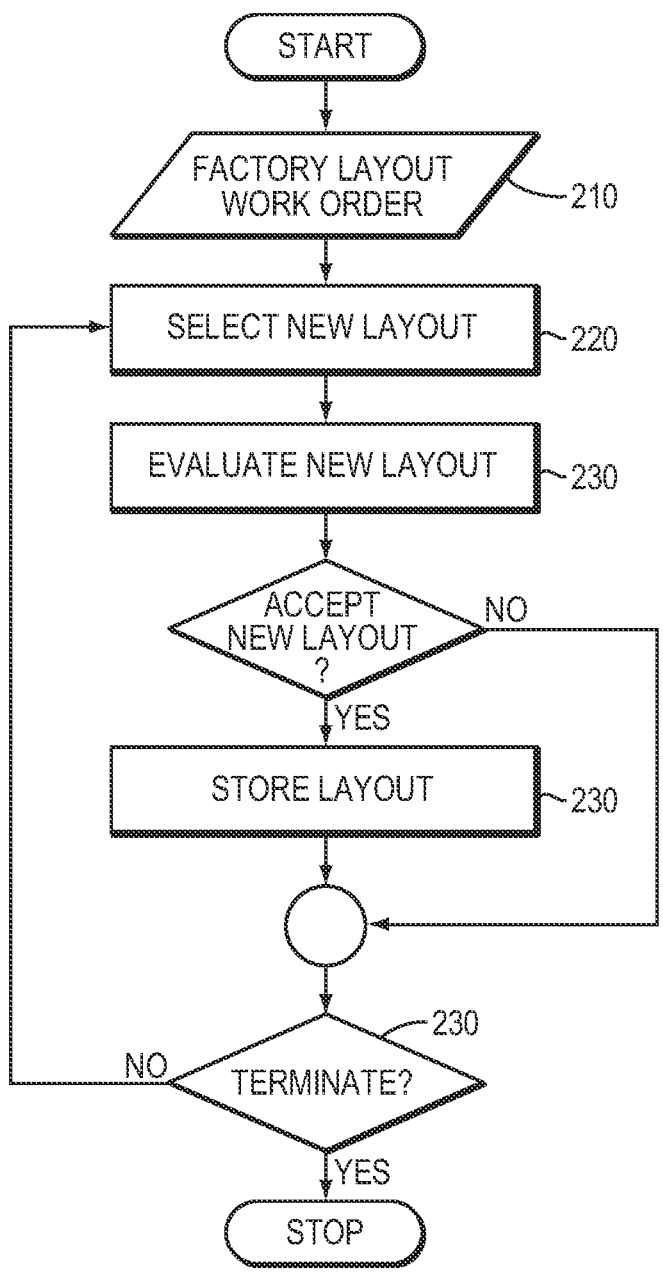
FIG. 2 is a flowchart showing exemplary operation of a layout simulation subsystem in accordance with embodiments of the invention.

The flowchart 200 shown in FIG. 2 illustrates the operation of a representative layout subsystem 150. In a first step 210, a work order is received. The work order specifies the constraints and requirements 140, including the operations to be performed and the objective function to be maximized (e.g., throughput) or minimized (e.g., power consumption or emissions). In step 210, the layout subsystem selects a factory layout template or an initial set of factory objects from the template store 120. In the latter case, the layout subsystem 150 may define the set of all possible layouts based on the selected factory objects. One of these may be chosen (step 220) as the current layout, either at random or based on initial application of the provided constraints; this may involve selection of attribute values of the factory objects within their allowed ranges. The performance of the current layout is simulated, and the results of the simulation are evaluated (step 230) based on the objective function. Another layout is chosen, or the current layout is modified, based on an optimization algorithm. In some embodiments, the optimization algorithm is a linear program, such as the simplex algorithm. In other embodiments, the optimization algorithm is a machine-learning algorithm such as a continuous optimization algorithm. For example, with each iteration, a step vector may be computed using a fixed update formula, which is then used to modify the iterate. The update formula may be a function of the history of gradients of the objective function evaluated at the current and past iterates. For example, in gradient descent, the update formula is a scaled negative gradient; in momentum, the update formula is a scaled exponential moving average of the gradients. Alternatively, reinforcement learning can be employed. Reinforcement-learning algorithms such as DQN (or other Q-learning algorithms) may use graph representations (such as the precedence graph described below) as the basis upon which a neural network builds an optimal solution according to a probability-based policy that is refined with each iteration; the algorithm finds a policy with the maximum expected return, i.e., a layout best satisfying the objective function.

The new layout generated with each iteration of the chosen optimization algorithm, which may reflect a new configuration of objects and/or modification of attribute values within the allowed ranges, must satisfy the work order. The performance of this layout is calculated and compared to the current layout. Iteration continues in accordance with the algorithm until the system reaches a termination criterion (step 240) indicating that the objective function has been sufficiently optimized.

Operation of the layout subsystem 150 may be understood with reference to the following example, in which a bicycle is assembled pursuant to a series of defined tasks. The first step is to identify and list all of the tasks called for or implied by a work order and arrange them into groups as they may be performed in practice. This preparatory step is generally performed manually. A factory object is then defined for each of the tasks. Task object attributes include the task description, time to complete the task, physical and labor inputs required to complete the task, material and labor cost inputs, previous tasks that must or may be performed first ("precedent tasks"), subsequent tasks ("dependent tasks"), and whether the task is optional or specific to a particular finished product.

Task object attributes may also include tasks that can be considered "adjacent" to each other, so that they may be performed in groups, with tasks mapping to workcells whose object attributes include specific forms of assembly amenable to the particular group. Which tasks can be considered adjacent is a decision typically made by the human operator. Other task object attributes may be particular to a model-specific specific assembly process, and may include options—for example, "Gearing" for tasks involving assembly of bicycles with gears, as opposed to fixed gear; "Braking" for tasks involving assembly of bicycles with brakes; and "Luxury" for tasks involving high-end bicycles with, for example, a basket, headlights, or taillights.

The grouping of tasks can be made by the human operator, based on the knowledge of the object being assembled, or it may be automated, based on the minimization or maximization of specific task object attributes, such as time to assembly or assembly cost, but taking into account adjacency attributes of the tasks. This grouping can be performed using conventional combinatorial optimization algorithms (see, e.g., G. Boothroyd et al., Product Design for Manufacture and Assembly (2002) and Trevisan, Combinatorial Optimization: Exact and Approximate Algorithms (2011), available at https://theory.stanford.edu/~trevisan/books/cs261.pdf; both of these references are incorporated herein by reference).

An example output of the grouping of tasks, including attributes such as adjacency or optionality (e.g. Gearing, Braking, or Luxury), is set forth in Table 2 below. The table contains 34 tasks arranged into 9 groups as they might be performed in practice. For example, tasks 5, 6, and 7 involve rear wheel assembly. Thus, they are adjacent and can be grouped into the "Rear Wheel" group as they are performed at the same time and on the combined physical and labor inputs of those three tasks.

TABLE 2

| | Group | Task | Gearing | Braking | Luxury | Group-ID | Task-ID |
|---|---|---|---|---|---|---|---|
| 0 | | | | | | | |
| 1 | Initial | Unpack | | | | 1 | 1 |
| 2 | | Paint | | | | | 2 |
| 3 | | | | | | | |
| 4 | Front Wheel | Tire | | | | 2 | 3 |
| 5 | | Brake disks | | N, Y | | | 4 |
| 6 | | | | | | | |
| 7 | Rear Wheel | Gear cassette | | | | 3 | 5 |
| 8 | | Brake disks | | N, Y | | | 6 |
| 9 | | Tire | | | | | 7 |
| 10 | | | | | | | |
| 11 | Build Front | Head set | | | | 4 | 8 |
| 12 | | Fork | | | | | 9 |
| 13 | | Brakes | | | | | 10 |
| 14 | | Handlebars | | | | | 11 |
| 15 | | Wheel | | | | | 12 |
| 16 | | | | | | | |
| 17 | Build Middle | Bottom bracket | | | | 5 | 13 |
| 18 | | Crank arms | | | | | 14 |
| 19 | | Derailleur | N, Y | | | | 15 |
| 20 | | Pedals | | | | | 16 |
| 21 | | | | | | | |
| 22 | Build Rear | Derailleur | | | | 6 | 17 |
| 23 | | Brakes | | | | | 18 |
| 24 | | Wheel | | | | | 19 |
| 25 | | | | | | | |
| 26 | Shifting | Chain | | | | 7 | 20 |
| 27 | | Shift lever front | N, Y | | | | 21 |

TABLE 2-continued

| | Group | Task | Gearing | Braking | Luxury | Group-ID | Task-ID |
|---|---|---|---|---|---|---|---|
| 28 | | Shift cable front | N, Y | | | | 22 |
| 29 | | Shift level rear | | | | | 23 |
| 30 | | Shift cable rear | | | | | 24 |
| 31 | | | | | | | |
| 32 | Braking | Brake lever front | | | | 8 | 25 |
| 33 | | Brake lever rear | | | | | 26 |
| 34 | | Brake cable front | | | | | 27 |
| 35 | | Brake cable rear | | | | | 28 |
| 36 | | | | | | | |
| 37 | Final | Seat post | | | | 9 | 29 |
| 38 | | Seat | | | | | 30 |
| 39 | | Handle grips | | | | | 31 |
| 40 | | Basket | | | N, Y | | 32 |
| 41 | | Headlight | | | N, Y | | 33 |
| 42 | | Taillight | | | N, Y | | 34 |

Attributes for the "Rear Wheel" group are a combination of attributes for each of the individual tasks. For example, the time needed to complete the "Rear Wheel" group assembly may be the simple sum of the times necessary for the three underlying Tasks. This attribute combination may be performed by the human operator.

In this bicycle example, each group is a partial task sequence, where the term "partial" means it is a subset of the tasks required to build the entire product, yet all groups are required for every bicycle. In this example, a linear dependence attribute is asserted within each task group, i.e., the sequence of tasks within each group must be performed serially in the specified order. Nonlinear dependence is permitted between task groups; that is, groups can depend on one or more previous groups. The key property of nonlinear dependence is that the child group may be completed in any relative temporal order, but all child groups must be completed before their parent task can begin. For example, Shifting or Braking can be performed in either order, but both Shifting and Braking must be completed before Final Assembly.

Figure 3:
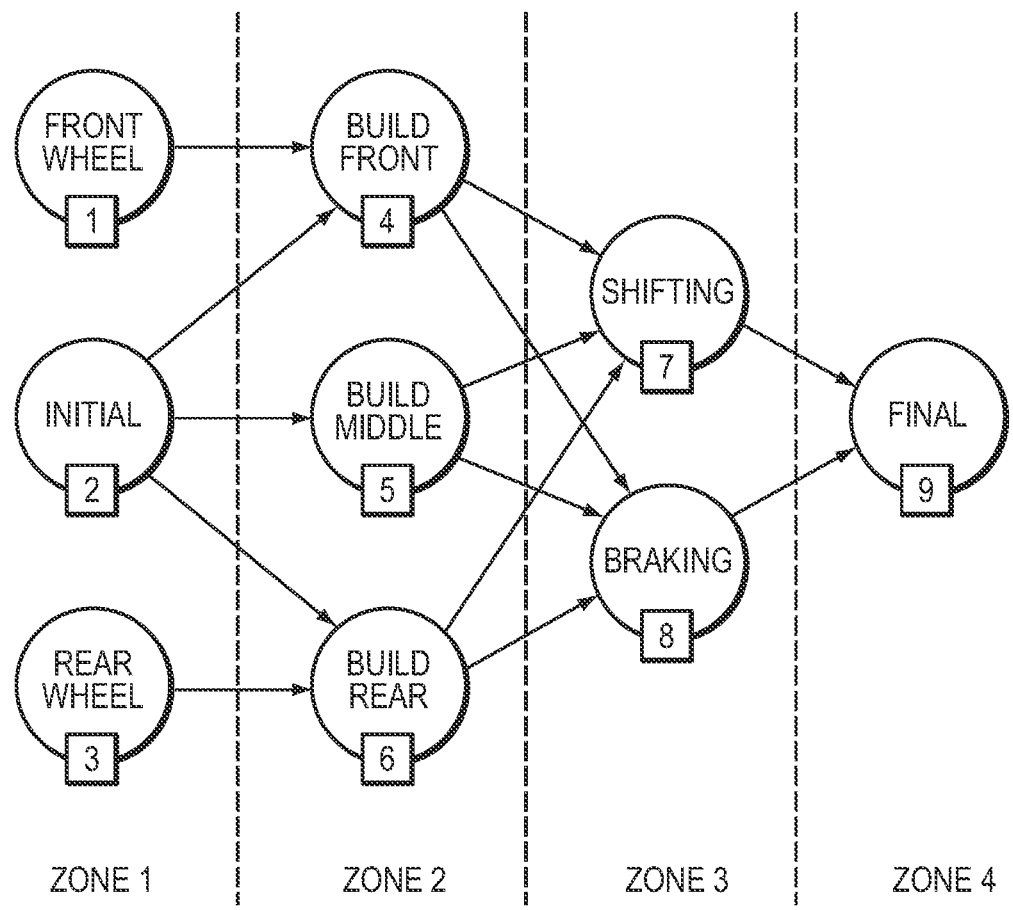
FIG. 3 is a representative precedence graph in in accordance with embodiments of the invention.

As noted, the simplified bicycle task sequence consists of 9 groups, shown with their dependencies as a precedence graph in FIG. 3. Dashed lines define zones based upon dependency, i.e., groups within a zone require one or more groups from the previous zone as input. Groups within each zone can be permuted as shown in Table 3 below. For example, the Build Rear task can only be completed once the Initial and Rear Wheel tasks have been completed. While every task must be completed to assemble the bicycle, there is some freedom in the exact order. The precedence graph may be generated manually or using conventional graphing algorithms.

TABLE 3

| Zone 1 | Zone 2 | Zone 3 | Zone 4 |
|---|---|---|---|
| [1, 2, 3] | [4, 5, 6] | [7, 8] | [9] |
| [1, 3, 2] | [4, 6, 5] | [8, 7] | |
| [2, 1, 3] | [5, 4, 6] | | |
| [2, 3, 1] | [5, 6, 4] | | |
| [3, 1, 2] | [6, 4, 5] | | |
| [3, 2, 1] | [6, 5, 4] | | |

Group sequences are the 72 permutations obtained by taking one list from each zone. For example, the first group sequence, spanning zones 1-4, is [1, 2, 3, 4, 5, 6, 7, 8, 9]; the second group sequence is [1, 2, 3, 4, 5, 6, 8, 7, 9], and the 72nd group sequence is [3, 2, 1, 6, 5, 4, 8, 7, 9].

To model the assembly process, these group sequences are represented in a way that reflects not only their sequence but also their nonlinear dependency. In a given group sequence, each group accepts one or more previous groups but only one following group. This is a "directed tree," with each parent having one or more children, but each child having only one parent. Exceptions are that groups in zone 1 have no children, and the final group in zone 4 has no parent.

Every bicycle requires every group for assembly. For each group, the list of tasks may be substituted to produce task sequences each with 34 tasks in unique order. For example,
Sequence Index=37
Group Sequence=[2, 3, 1, 4, 5, 6, 8, 7, 9]
Task Sequence=[3, 4, 5, 6, 7, 1, 2, 8, 9, 10, 11, 12, 13, 14, 15, 16, 17, 18, 19, 25, 26, 27, 28, 20, 21, 22, 23, 24, 29, 30, 31, 32, 33, 34]

Each of the 72 task sequences includes all 34 tasks. The variability in task sequences arises from the commutative property of groups within each zone, which arises solely from the group dependency. Table 2 also shows tasks with optional attributes, leading to product variants with fewer than 34 tasks. Because there are 3 optional tasks, each a binary choice, there are $2^3=8$ product variants. Each product variant can exploit the 72 options, giving a total of 8×72=576 product variants.

Figure 4:
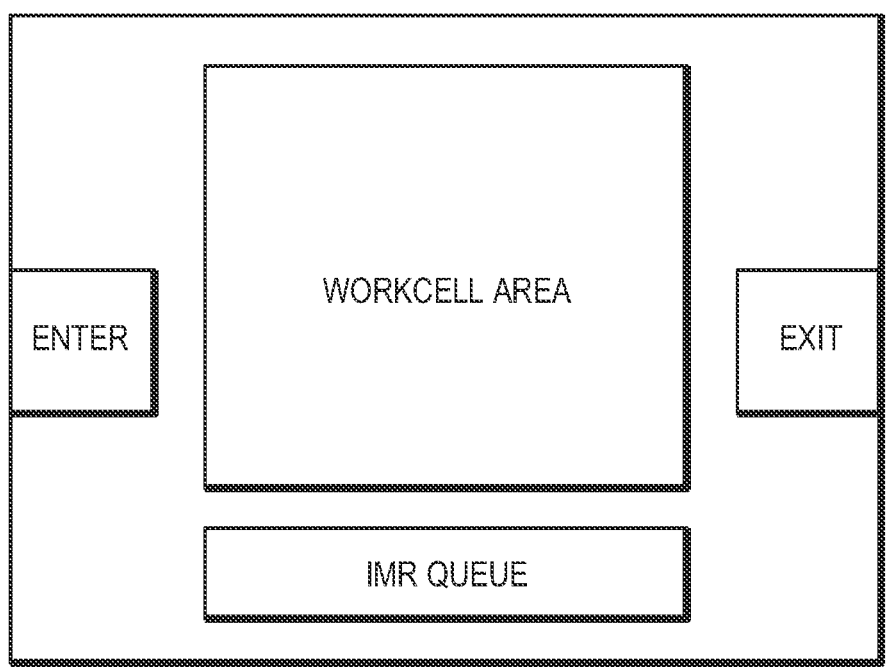
FIG. 4 schematically illustrates a basic factory layout suitable for use with embodiments of the invention.

Assembly sequence planning is one of the well-known combinatorial optimization problems in manufacturing. Once the assembly is represented by a precedence graph, the group objects and their attributes (including optionality), traditional methods of combinatorial optimization may be used to generate a large number of feasible assembly sequences and then find the optimal sequence according to the objective function. Once a precedence graph has been established, the groups are mapped to workcell objects corresponding to physical workcells with dimensions and locations on the factory floor. Suppose that the parts to be assembled are brought into the factory (as represented by a factory object, with attributes relating to workspace area, available utilities, physical dimensions, etc.) from the left and leave the factory, assembled, on the right as shown in FIG. 4. At the bottom of the factory is space for IMRs to queue. Each of the IMRs is represented by an IMR object with attributes specifying speed, payload, geometric format, battery life, etc.

Figure 5:
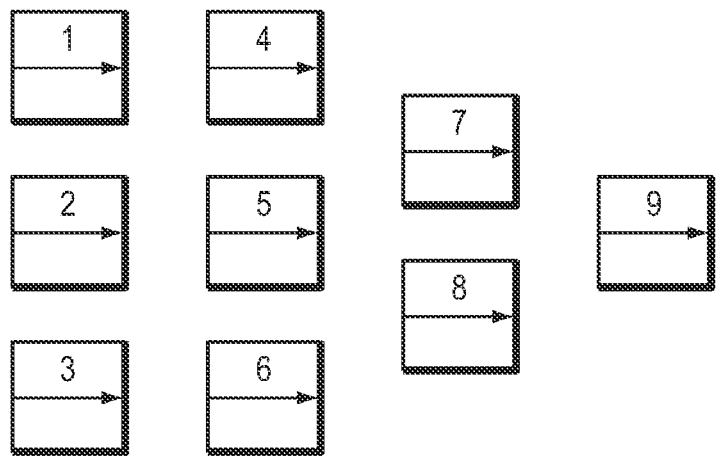
FIG. 5 is a precedence graph corresponding to an initial mapping of groups to workcells in accordance with embodiments of the invention.
Figure 6:
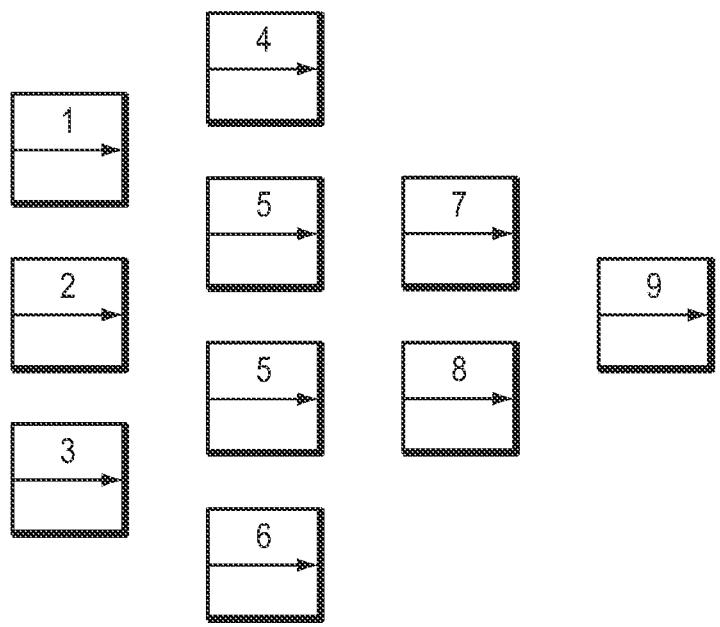
FIG. 6 illustrates an improved mapping of groups to workcells.

The initial mapping of groups to workcells (i.e., workcell objects) begins with the precedence graph as shown in FIG. 5. The next step is to optimize the number of workcells per group so as to optimize the objective function—e.g., maximize a profit function (for example, minimize cycle time) or minimize a cost function (for example, capital expenditures or occupied factory floor space). If, for example, group 5 ("Build Middle") is a particularly lengthy step and is the cycle time bottleneck, a standard optimization algorithm may propose that the tradeoff between the layout of two group 5 workcells (including the cost of the workcell and labor, plus space utilization) would improve a profit function relative to only one group 5 workcell. This "de-bottlenecking" configuration is shown in FIG. 6.

The next step is to optimize the layout of workcells. Assume that the optimal number of workcells is represented by FIG. 5. Optimizing the layout means accounting for optimal IMR motion—minimizing, for example, total cycle time or IMR total travel. Optimization can exploit the flexible order among tasks and minimize IMR congestion among the workcells in order to optimize the overall efficiency of the factory.

In one embodiment, the layouts are scored using the product of the total path length and a congestion penalty when paths intersect. The congestion penalty may be a function of the type of intersection involved; for example, with reference to FIG. 7, the penalty may be determined by the number of paths that enter the intersection. An intersection with one entering path has a penalty of 0 because it is never necessary to stop at the intersection. An intersection with two entering paths has a penalty of 1 because, if two vehicles approach the intersection at the same time, one vehicle must wait for the other. Finally, an intersection with three entering paths has a penalty of 2 because two vehicles may have to wait for another vehicle.

Figure 8:
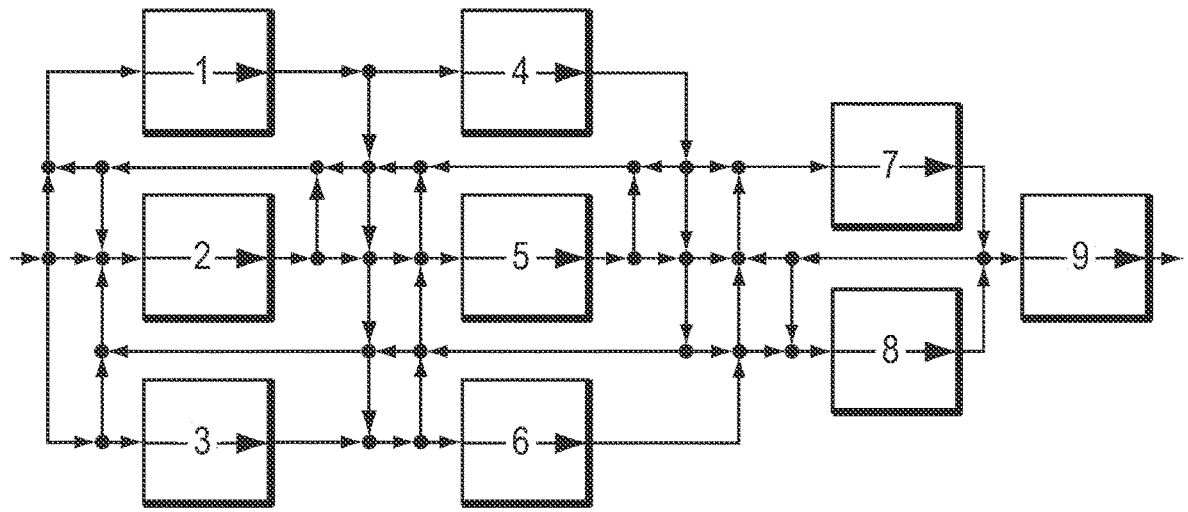
FIGS. 8-10 graphically depict paths followed by a mobile robot in various candidate factory layouts.

Simulation of thousands of possible workcell layouts using standard optimization algorithms (such as Coffman-Graham or Turán's brick factory algorithm) indicates the layout in FIG. 5 to be one of the least efficient under the metric of (for example) total IMR travel time or minimization of expected IMR collisions. This layout creates a significant amount of congestion because it forces IMRs to cross paths in an unstructured way, resulting in a path length of 150 and a congestion penalty of 20. The workcells are oriented from left to right so that IMRs enter from the left and exit from the right. This means that, for example, were an IMR to start at workcell 1 and proceed to workcell 2, it would have to double back to get to the entrance of workcell 2 as illustrated in FIG. 8. This would create two intersections that could become highly congested choke points. This would not happen in isolation—other IMRs would be moving through the factory as well—so this IMR would potentially cross the paths of several other IMRs in the process.

Figure 9:
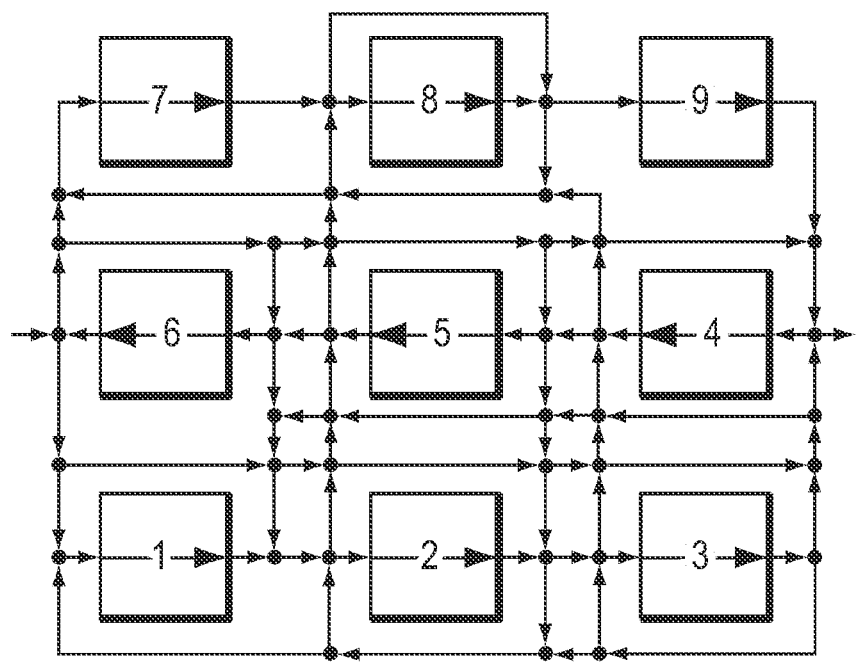

Another layout attempted by the simulation, illustrated in FIG. 9, shows the workcells laid out in a 3×3 arrangement. The rows of workcells are aligned entrance-to-exit, providing a natural structure for the IMRs to use for "out-of-order" tasks without creating significant congestion. However, this layout does not take full advantage of the precedence relationship among workcells. As a result, the total path length (219) and congestion penalty (29) are the greatest of the three examples.

Figure 7:
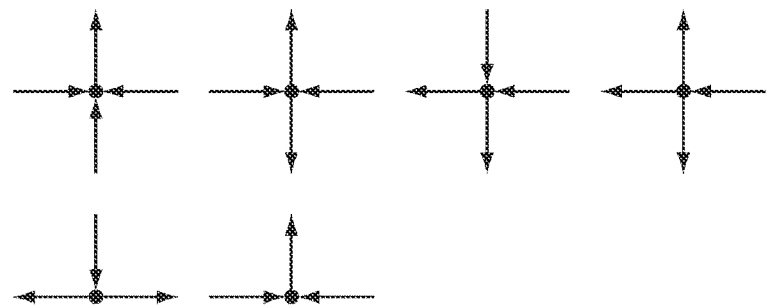
FIG. 7 graphically depicts a methodology for determining a congestion penalty among candidate paths in a factory layout.
Figure 10:
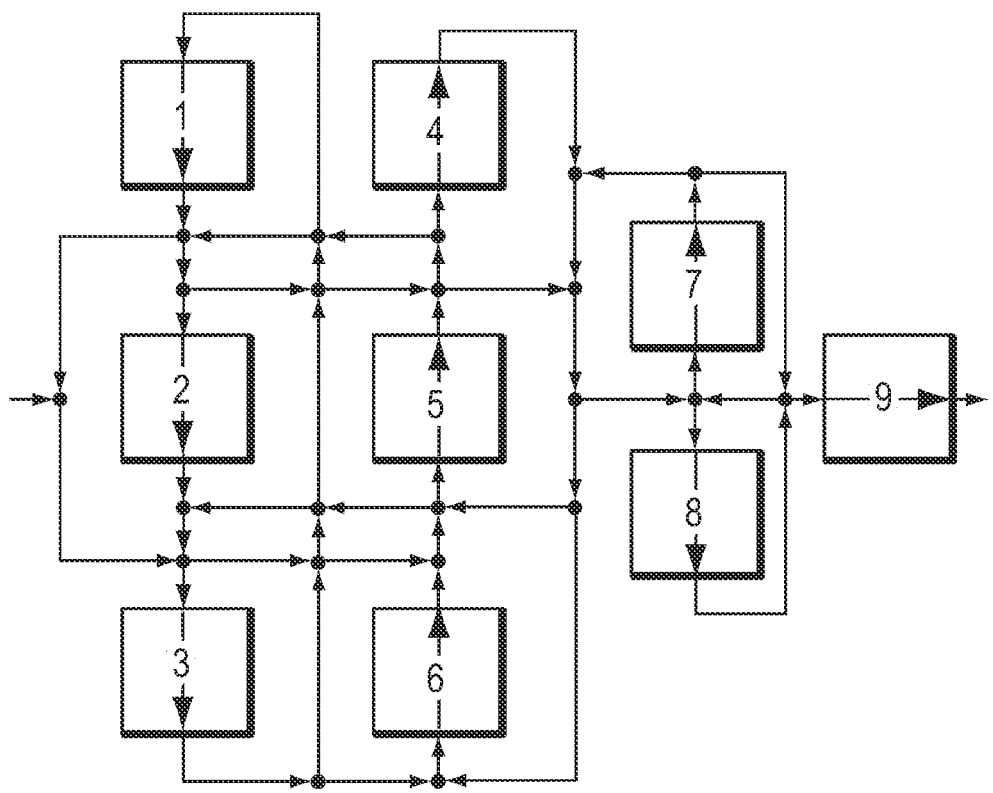

The simulation reveals that the layout shown in FIG. 10 is close to optimal under the constraint of minimizing IMR travel and potential collisions (the path length is 148 and the congestion penalty is 15). This layout is similar to that of FIG. 5, but the workcells are aligned in a manner similar to that shown in FIG. 9. This exploits the precedence graph and creates a structure that reduces IMR congestion and IMR travel time. The orientation of the workcells has been selected to reduce both the total path length (albeit by a small amount) and the congestion penalty. In particular, the high-congestion intersections seen in FIG. 7 are removed.

4. Scheduling Optimization

A schedule is built by allocating tasks in time for each product unit's task sequence. Hence, scheduling is layout-dependent and scheduling optimization generally follows layout optimization. This need not be the case, however; the processes can be combined, with scheduling optimization applied to intermediate layout candidates. For example, if the objective function maximizes throughput, one approach to optimization is to derive an optimal schedule as described below for a candidate layout and modify the layout in a manner likely to improve the schedule. For example, certain parameters (e.g., the workcell orientation) of the candidate layout may be varied randomly and the schedule simulation re-run and scored. If scheduling improves, the revised layout is retained. In effect, this is a gradient search to another local optimum in the search space from which optimization may continue.

In general, scheduling optimization may be guided or bounded by fixed rules or principles such as:
1. Prevent overlapping tasks in a workcell.
2. Assign a task to a single workcell.
3. A task, once started, must continue to completion.
4. Resource constraints must also be accounted for when allocating a task in time:
   a. Only active workcells can be assigned tasks.
   b. Tasks are assigned to time intervals when the workcell is idle.
   c. A workcell with the capability to process a task is available for that task if it has no task scheduled for the time interval equal to or larger than the task process time.
   d. If a task type requires workcell setup, the task is scheduled after the workcell setup procedure is completed. The workcell setup is independent of the work-in-process (WIP), but depends on parts and tools to arrive, if these are required by the setup or task.
   e. Depending on the task type, for similar tasks to be executed in sequence at the same workcell, the workcell might perform a reset procedure before starting the next task.
5. Follow the task precedence specified by the task sequence chosen for the product unit.
   a. A task with multiple precedents can only be allocated after all its immediate precedent tasks have been allocated.
6. Task resources availability: the task will be scheduled after all resources required by the task type are scheduled to arrive at the designated workcell.
7. IMR availability
   a. The earliest nearby IMRs with the required transportation capability are assigned to pick up a WIP.
   b. A task is assigned to an IMR after the IMR becomes available.
   c. After arriving at a workcell, an IMR can proceed to the workcell output port and wait for the WIP.
   d. An IMR can be scheduled to drop off a WIP at the workcell input port and depart to a designated area at the factory or be assigned to another task.
   e. An IMR can be assigned to pick up WIP at a workcell output port and depart to another workcell or a designated area at the factory.
   f. An IMR task is created each time an IMR is assigned to a product unit.
8. Transportation time: tasks will start no sooner than after the transportation unit is scheduled to arrive at its destination.
9. Factory floor: the paths of two or more IMRs cannot intersect at the same time.

Figure 11:
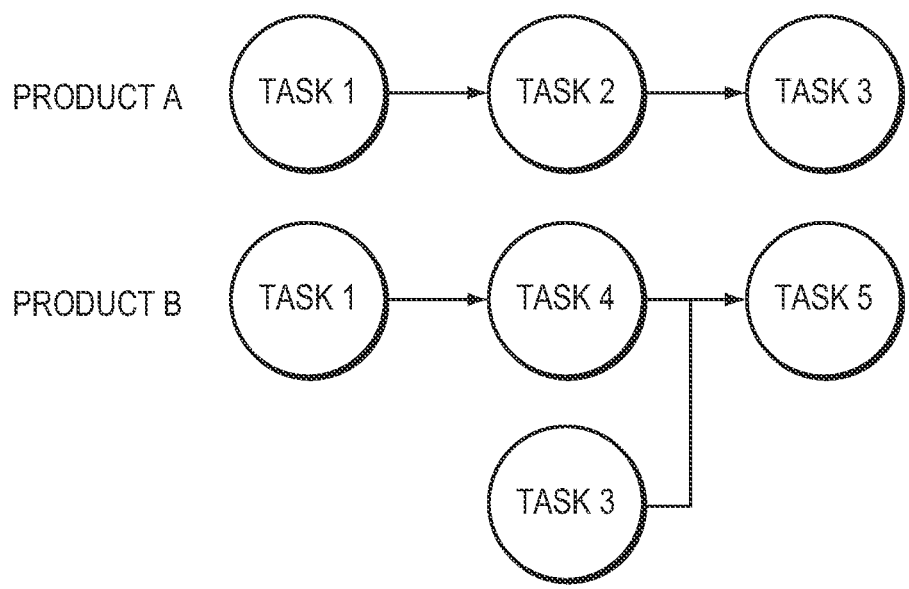
FIG. 11 graphically depicts an exemplary sequence of production tasks whose execution results in production of two products.

An exemplary sequence of tasks is shown in FIG. 11. Execution of this task sequence results in production of two products, A and B, and the arrows illustrate the dependency between tasks. Product A represents a special case where, with the exception of the single first task, every task has only one dependent task. Product B illustrates the dependency of task 5 on multiple tasks, i.e., 3 and 4; in other words, tasks 3 and 4 are required to be performed before task 5.

Figure 12A:
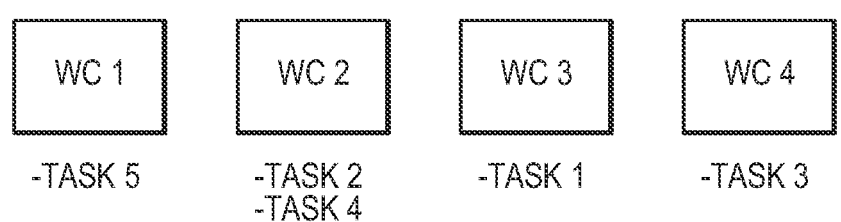
FIG. 12A shows task-execution capabilities of four workcells.
Figure 12B:
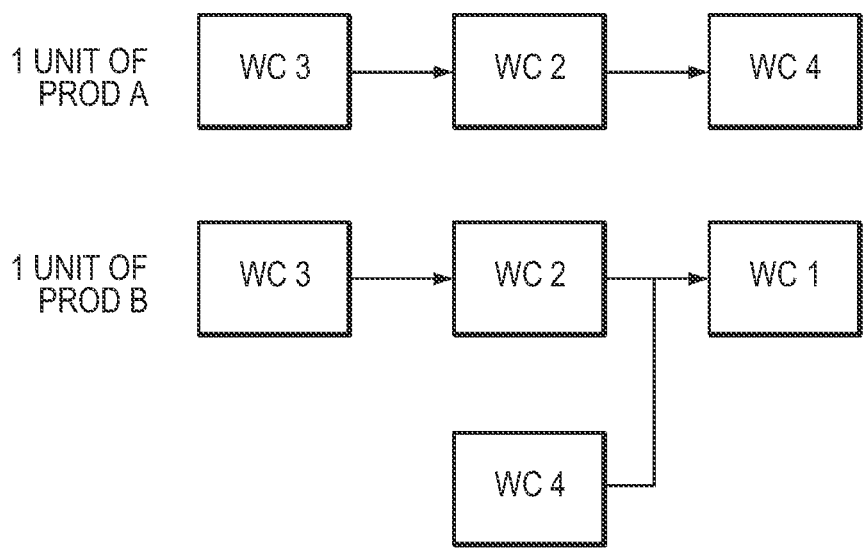
FIG. 12B illustrates a representative layout design for these workcells.

A workcell sequence may be defined as described above, as an optimized layout. The layout will depend on workcell capability; FIG. 12A shows the task-execution capabilities of four workcells, WC1-WC4, and FIG. 12B illustrates a representative layout design (e.g., one that has been generated by layout optimization as described above, or a candidate layout design). The workcell layout and sequence shown in FIG. 12B can fulfill a work order of one unit of each product type.

The following algorithm may be used to produce a candidate (unoptimized) schedule for a workcell sequence WC_sequence:

```
1. Procedure Task_allocation(WC_sequence,
         WC_schedule, Transportation_schedule)
2.    Create empty dictionary proposed\_schedules
3.    Randomly assign order of product units
4.    Create new WC_temp_schedule          -->Start time is 0
5.    for all product_unit in WC_sequence
6.       while task in product_unit pending schedule
7.          for all task in product_unit
8.             Allocate task at WC_temp_schedule subject to:
                     Task sequence precedence.
9.          end for
10.      end while
11.   end for
12.   proposed_WC_sch is a copy of         -->Start time is updated
         WC_schedule
13.   proposed_IMR_sch is a copy of IMR_schedule
14.   for all product_unit in WC_sequence
15.      for all task in product_unit
16.         Find IMR with earliest availability at proposed_IMR_sch
17.         Find task time slot at proposed_WC_sch subject to:
                  IMR availability; and
                  Task sequence precedence.
18.         Create IMR task
19.         Update proposed_IMR_schedule
20.         Update proposed_WC_sch
21.      end for
22.   end for
23.   Add costs for proposed_WC_sch to proposed_schedules
24.   Add costs for proposed IMR_sch to proposed_schedules
25.   Add proposed_IMR_sch to proposed_schedules
26.   Add proposed_WC_sch to proposed_schedules
27.   return proposed_schedules
28. end procedure
```

Figure 13:
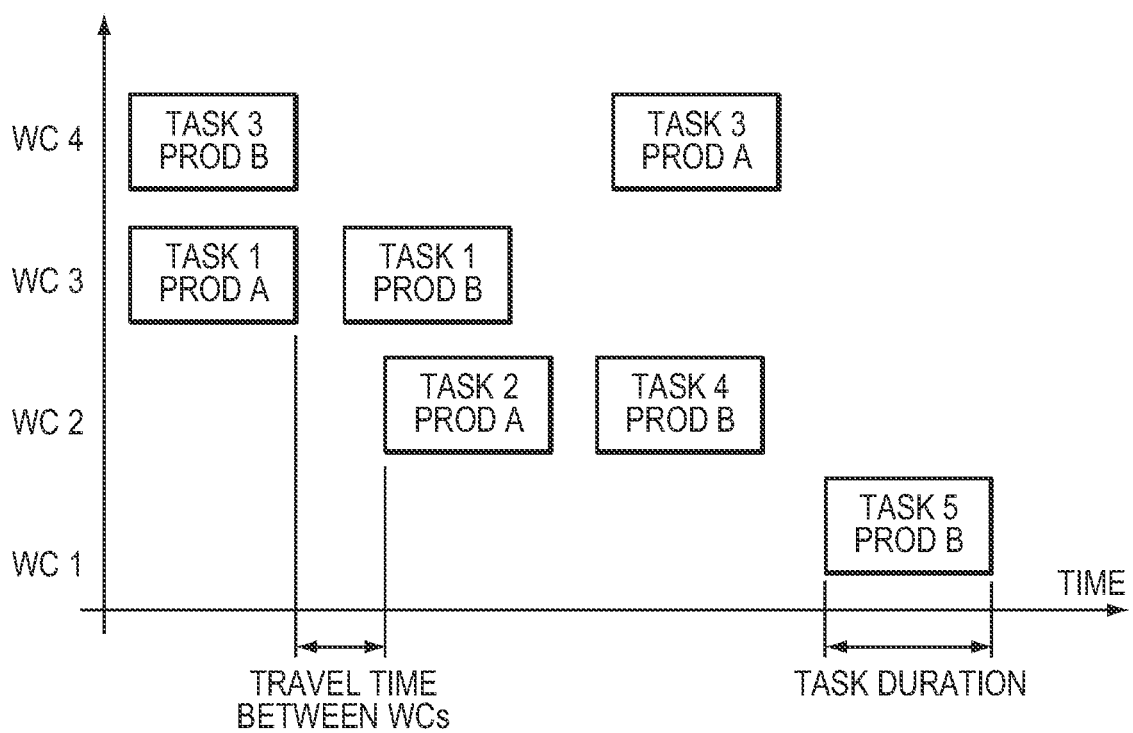
FIG. 13 depicts a representative [missing word?] generated for the layout design of FIG. 12B.

Applying this algorithm to the sequence shown in FIG. 12B results in the schedule illustrated in FIG. 13.

A workcell schedule can be optimized according to the performance metrics sought. For instance, when possible, tasks are assigned to a workcell as early as possible as an attempt to compress the workcell schedule, resulting in the resources involved, such as IMR availability, being updated accordingly. Preventing IMRs from accumulating at a workcell entrance is another example of optimization with the goal of preventing traffic congestion; this is described in detail below. Another approach to schedule optimization is generating different schedules and optimizing to an objective function as described above. Parameters that may be varied in the optimization include:
1. Product throughput
2. Product type throughput
3. workcell utilization
4. IMR utilization
5. IMR traveled distance
6. Workcell downtime
7. IMR downtime
8. Product batch completion time
9. Work order completion time Once again, candidate solutions are generated by evolving previously known solutions until stopping conditions are met. The search may terminate if a solution that meets minimum requirements is found before a predefined timeout. In the event of a timeout, the candidates are ranked and the best solution is selected used as the workcell and transportation schedules.

Another approach is to optimize routing rather than optimizing the schedule per se; often the best routing protocol corresponds to the optimal schedule. Routing optimization plans and coordinates the motion of the IMR fleet to maximize the throughput of the factory; this process is sometimes referred to as the multi-robot motion planning problem. Both "coupled" and "decoupled" approaches to solve the multi-robot motion planning problem are known. Coupled methods extend single-robot path planning algorithms, which consider all potential collisions during the planning stage. However, the search space of this approach grows exponentially with the number of robots, which makes them unresponsive to the changes in the workspace and computationally unattractive. Decoupled methods address the computational load by breaking this challenging problem into two sub-problems: path planning and motion coordination. Path planning deals with finding a path for robots in the fleet, ignoring the potential collisions enroute. Motion coordination monitors the fleet and, if necessary, replans IMR motions to avoid collisions.

Decoupled methods can be classified as either centralized or decentralized. In decentralized approaches, each IMR plans its own path and communicates with its neighboring IMR to resolve collisions. Motion planning occurs at the IMR level using local information, which provides the states of the IMR within the communication range. A particular IMR might not receive information within the neighborhood because of the communication overhead, or the planned trajectory might lead to severe motion interferes with the IMRs that stay just outside the communication radius. Local information related to moving or stationary objects cannot guarantee collision-free or blockage-free motion for the fleet, or solution optimality. Centralized methods ensure the optimality and existence of a solution by gathering all information related to the fleet in a single processing unit. The single processing unit serves as a supervisory controller, which keeps track of the states of the IMRs, computes trajectories for the fleet, and prevents collisions.

Embodiments of the scheduling subsystem 155 utilize a centralized, decoupled approach to motion planning. In case the positional states of all moving or stationary objects, including but not limited to IMRs, workcells, human workers, and robots are available, this information is used to ensure the safety and unobstructed motion of the IMR fleet in the factory. The scheduling subsystem 155 may determine the IMR trajectories using the initial state of the IMRs and the factory layout. In these embodiments, the path planning part of the scheduling subsystem 155 employs a transportation network to find a route between any two locations of the factory. The motion coordination part of the scheduling subsystem 155 incorporates multiple steps of operations such as prediction, projection of future states, collision prediction, and optimization of IMR control commands to meet system performance levels.

The following nseudocode specifies a representative execution order:

```
1: procedure RUNTIME(I M R_data)
2:    Run IMR State Prediction (I M R_data)
3:    Run Collision Prediction (Predicted_I M R_states)
4:    Run Optimization (Predicted_I M R_states, Conflicting_I M R_pairs)
5:    return I M R_control_commands
6: end procedure
```

The scheduling subsystem 155 may maintain a topological representation of the factory as a digraph, which has a set of nodes (in the literature also called vertices) and edges. The nodes represent workcell input/output ports or any intermediate point on the factory floor that IMRs can visit, and edges represent directed paths that link nodes to each other. FIG. 14A illustrates representation of a factory floor as a grid 1400, and FIG. 14B indicates the locations of the nodes; the arrows are the directed edges of the transportation network. The scheduling subsystem 155 may utilize this representation for path planning (e.g., to find the best path for a given set of performance metrics), (ii) motion coordination using an occupancy map of the factory, and (iii) accommodating blockage of some specific areas of the factory (e.g., charging stations, parking, or temporary waiting areas). The below algorithm may be used to generate the topological factory representation.

```
1: procedure INIT(wc, factory_dimensions, wc_parameters, parking_lots)
2:    Create 2D grid
3:    Find Workcell Boundaries
4:    Remove Workcell Nodes and Edges
5:    Create Parking Zone
6:    return transportation_network
7: end procedure
```

A prediction component of the scheduling subsystem 155 uses position and orientation measurements and a motion model of the IMRs to estimate the current and near-future positions and orientation of IMRs. FIG. 15 illustrates the prediction of an IMR position on the given path or trajectory, where p(t) is the current position of the IMR and p̂(t) is the predicted position after a time step. In particular, the prediction component estimates the long-term future states of IMRs that originate from their current states by considering their path, motion models, and constraints—e.g., in accordance with the following algorithm:

```
1: procedure PREDICTION(I M R_data)
2:    for all I M R ∈ imr_list do
3:       Predict the states of the IMR
4:       Map IMR rigid body to the grid
5:    end for
6:    return Predicted_I M R_states, occupancy_grid
7: end procedure
```

A collision prediction component of the scheduling subsystem 155 may continually monitor potential collisions among two or more IMRs. Potential collisions are fed back to the path-planning component of the scheduling subsystem 155, which re-plans these IMRs' trajectories to prevent imminent collisions. In some embodiments, potential collisions are fed back to the layout subsystem 150, which may modify the layout to avoid collisions. (e.g. workcell orientation)

Figure 16:
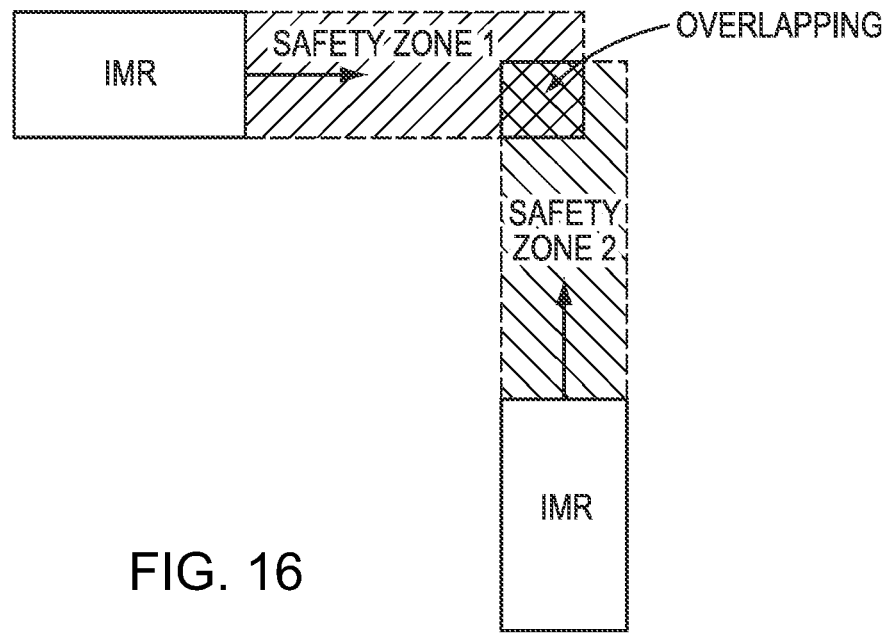
FIG. 16 graphically illustrates an example configuration of two mobile robots and their overlapping safety regions.

To achieve a safe fleet motion-coordination objective, position and orientation data may be combined with additional metrics such as IMR safety regions, change in the relative distance, and the relative distance between any two objects in the same neighborhood. The IMR safety region may be a rectangular area that extends out from the front bumper of an IMR and aligns with its motion direction. FIG. 16 illustrates an example configuration of two IMRs and their overlapping safety regions, i.e., Safety Zones 1 and 2. The width of the safety region may be equal to the width of the associated IMR, and the length of the safety region can be shorter or longer than the IMR length. A lengthy IMR safety region permits detection of potential collisions well in advance, enabling the path-planning component to take action earlier and prevent a collision with only minor changes in IMR motion commands and task arrival times. On the other hand, lengthy safety regions lead to more safety-region overlaps that can prompt adjustments more often than needed, significantly increasing the computational burden. The length of the safety region is a parameter that is desirably tuned such that the potential collision capture is maximized with a minimum computational effort.

The planar 2D motion of an IMR may be described by position vectors expressed with respect to the fixed reference frame, and the relative distance between any two IMRs may be expressed as $$d=\|p_1-p_2\|$$

where $\|\circ\|$ returns the Euclidean norm of a vector. The relative distance calculation does not consider the geometry of the IMRs; therefore, it does not serve as a clearance, which refers to a free-space, between two IMRs. The change in the relative distance results in meaningful criteria for collision prediction, i.e., decreasing relative distance over time indicates that IMRs are moving towards each other. IMRs that locate in a similar vicinity can be identified when their relative distance is less than the IMR collision detection radius, a parameter that may be tuned so that only emerging collisions are timely captured.

The below pseudocode implements the collision-prediction component of the scheduling subsystem 155. After all three conditions are applied, the IMRs that meet all of them are specified as conflicting MIts, and sets of conflicting IMR pairs may be analyzed by an optimizer to determine whether they require any control actions.

```
1: procedure COLLISION PREDICTION(Predicted_I M R_states)
2:    for all I M R ∈ imr_list do
3:       Compute IMR Safety Zones
4:       Compute Relative Distances
5:       Compute Change in the Relative Distances
6:    end for
7:    Compute the IMRs within the same neighborhood
8:    Compute Overlapping Safety Zones
9:    Find IMRs that satisfy all Conditions
10:   return Conflicting_I M R_pairs
11: end procedure
```

The optimizer of the scheduling subsystem 155 gathers information from the prediction and collision prediction components, and alters route planning or updates the commands that the IMRs are already executing in accordance with an optimization algorithm (e.g., a combinatorial optimization algorithm) as described above. In some cases, the optimizer may produce a locally optimal solution, which resolves potential collisions but cannot satisfy the temporal constraint on the overall task. The scheduling subsystem 155 may attempt to revise this type of solution, which is not optimal but satisfies the relaxed constraints, to compensate for the delays or other impacts. The output of the optimizer may include or consist of motion commands for the IMR fleet, including but not limited to a path, trajectory, linear and angular velocities, or a new positional state causing the IMRs to wait temporarily. The below pseudocode implements the optimizer component of the scheduling subsystem 155.

```
1: procedure OPTIMIZATION(Predicted_I M R_states,
   Conflicting_I M R_pairs)
2:    for all I M R_pair ∈ Conflicting_I M R_pairs do
3:       Project the states of the conflicting IMRs
4:       Check overlaps in the projected IMRs' states
5:       if projected_motion_conflicts > 0 then
6:          repeat
7:             Plan conflicting IMRs' motion commands
8:          until projected_motion_conflicts = 0
9:       end if
10:   end for
11:   return I M R_control_commands
12: end procedure
```

Figures 17A, 17B:
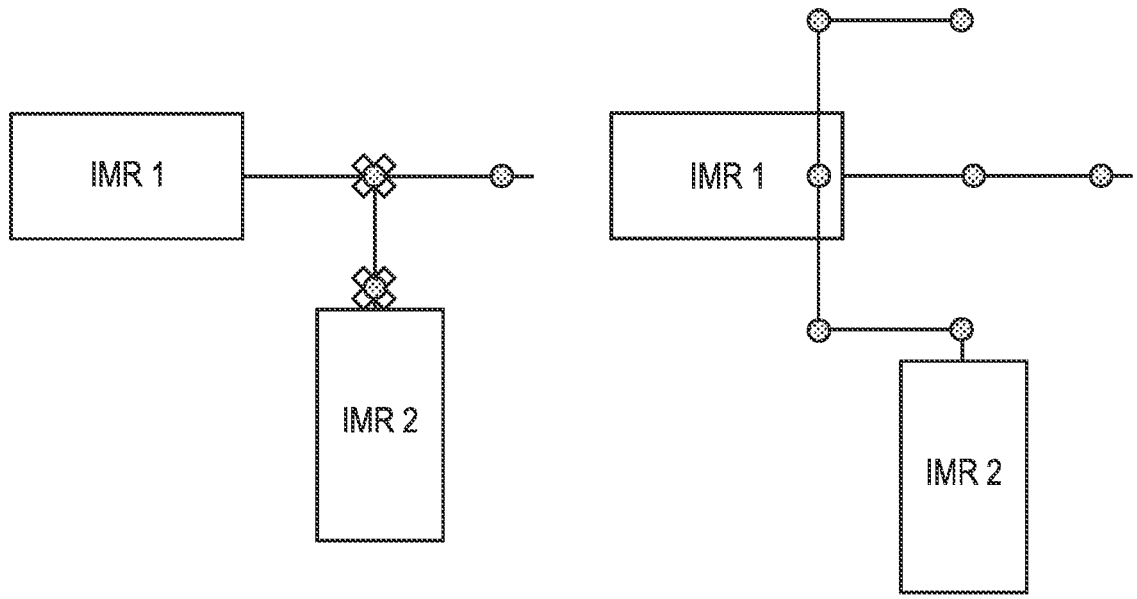
FIG. 17A graphically illustrates a scenario involving the potential collision of two mobile robots and FIG. 17B shows a collision-free path solution for this scenario.

FIG. 17A illustrates a hypothetical scenario in which the collision prediction component of the scheduling subsystem 155 detects the potential collision of two IMRs (IMR 1, IMR 2) and the manner in which their initial paths cross. The optimizer finds the collision-free solution for this scenario as shown in FIG. 17B and updates the trajectory of IMR 2. In this solution, two additional nodes are included in the path of IMR 2 to prevent the potential collision. However, this path change will affect the IMR and workcell schedules, which are therefore revised by the scheduling subsystem 155 in the manner described above It should be stressed that, although the previous discussion assumed that IMRs are identical, the scheduling subsystem 155 supports non-identical IMRs that have different capabilities, hardware, and kinematic and dynamic models as specified in their corresponding factory object attributes.

Certain embodiments of the present invention are described above. It is, however, expressly noted that the present invention is not limited to those embodiments; rather, additions and modifications to what is expressly described herein are also included within the scope of the invention.

What is claimed is:

1. A method of scheduling, for execution in a facility having a layout, the method comprising the steps of:
   (a) storing, in a computer memory, a plurality of object data structures each corresponding to a machine or a human and containing data and/or instructions for simulating behavior in (i) carrying out a task, (ii) allowed movement about the facility, (iii) speed of operation and movement based on inherent characteristics of the machine or the human and proximity thereof to other objects, wherein the object data structures include parameter values constraining the simulated behavior, at least some of the machines are mobile, and at least one of the object data structures corresponds to a human and references a model of human anatomy and movement;
   (b) receiving, by a computational simulator, a work order and an objective function specifying a quantity to be maximized and a representation of at least a portion of the layout;
   (c) based on the work order, simulating, using the computational simulator and the stored object data structures, performance of the work including movement of the mobile machines and at least one human in the facility along one or more planned paths;
   (d) iteratively repeating step (c) with object parameter values and paths that have been updated in accordance with, respectively, an optimization algorithm and a path-planning algorithm until the quantity specified by the objective function is maximized; and
   (e) generating an operation schedule for the machines represented by object data structures.

2. The method of claim 1, wherein the path-planning algorithm finds the best path for a given set of performance metrics.

3. The method of claim 2, wherein the path-planning algorithm uses position and orientation measurements and a motion model of the mobile machines to estimate current and near-future positions and orientation of the mobile machines during performance of the task.

4. The method of claim 3, wherein the path-planning algorithm estimates long-term future states of the mobile machines based on current paths, motion models, and movement constraints.

5. The method of claim 4, further comprising predicting collisions between mobile machines during simulated performance of the work.

6. The method of claim 5, wherein the path-planning algorithm is responsive to the predicted collisions in generating the best paths.

7. The method of claim 6, wherein the predicted collisions are used to define safety regions around the mobile machines.

8. The method of claim 1, wherein at least some of the objects are mobile machine objects that each specify (i) capability parameter values including a movement speed range of the mobile machine and (ii) behavior parameter values including speed restrictions of the mobile machine based on proximity of the mobile machine to machines or humans represented by other objects.

9. The method of claim 8, wherein the capability parameter values further include a payload capacity of the machine.

10. The method of claim 8, wherein the mobile machine objects further specify loading and unloading capabilities.

11. The method of claim 1, wherein the objective function specifies at least one of (i) minimum time for work order completion, (ii), output quantity, (iii) output quality, (iv) safety to humans, (v) minimum power consumption, (vi) a production cost function, or (vii) a production profit function.

12. The method of claim 1, wherein the optimization algorithm is a continuous optimization algorithm.

13. The method of claim 1, wherein the optimization algorithm is a reinforcement learning algorithm.

14. The method of claim 1, wherein the optimization algorithm is a linear program.

* * * * *